(12) United States Patent
Pinel et al.

(10) Patent No.: US 12,140,773 B2
(45) Date of Patent: Nov. 12, 2024

(54) OPTICAL DEVICE COMBINING A PLURALITY OF BEAMS AND SYSTEM USING SAME

(71) Applicant: CAILabs, Rennes (FR)

(72) Inventors: Olivier Pinel, Rennes (FR); Guillaume Labroille, Rennes (FR)

(73) Assignee: CAILabs, Rennes (FR)

( * ) Notice: Subject to any disclaimer, the term of this patent is extended or adjusted under 35 U.S.C. 154(b) by 761 days.

(21) Appl. No.: 17/427,246

(22) PCT Filed: Feb. 4, 2020

(86) PCT No.: PCT/EP2020/052738
§ 371 (c)(1),
(2) Date: Jul. 30, 2021

(87) PCT Pub. No.: WO2020/161126
PCT Pub. Date: Aug. 13, 2020

(65) Prior Publication Data
US 2022/0099984 A1 Mar. 31, 2022

(30) Foreign Application Priority Data

Feb. 4, 2019 (FR) ........................ 1901034

(51) Int. Cl.
*G02B 27/09* (2006.01)
*G02B 27/10* (2006.01)
(Continued)

(52) U.S. Cl.
CPC ....... *G02B 27/0905* (2013.01); *G02B 27/108* (2013.01); *H01S 3/005* (2013.01); *H01S 3/0085* (2013.01); *H01S 3/23* (2013.01)

(58) Field of Classification Search
CPC .................................................. G02B 27/108
See application file for complete search history.

(56) References Cited

U.S. PATENT DOCUMENTS

| 8,731,010 B2 * | 5/2014 | Messerly | H01S 3/2383 |
| | | | 372/18 |
| 9,250,454 B2 | 2/2016 | Morizur et al. | |

(Continued)

FOREIGN PATENT DOCUMENTS

| FR | 3078412 A1 | 8/2019 |
| WO | 2007/100752 | 9/2007 |

OTHER PUBLICATIONS

Bade et al., Fabrication and Characterization of a Mode-Selective 45 Node Spatial Multiplexer Based on Multi-Plane Light Conversion, Optical Fiber Communication Conference Post deadline Papers, OSA Technical Digest, Optical Society of America, (2018), paper Th4B.3, pp. 1-3.

(Continued)

*Primary Examiner* — Tuan N Nguyen
(74) *Attorney, Agent, or Firm* — TraskBritt (57) ABSTRACT

An optical device for forming an output light beam having at least one target mode, by combining a plurality of phase-locked input light beams collectively forming incident light radiation, comprises a conversion device, arranged between the input plane and the output plane, configured to carry out a modal conversion aimed at conveying the energy portion of incident radiation present in a main supermode to the target mode, and aimed at conveying the energy portion of the incident radiation present in interference supermodes to deformation modes. A system for producing an output light beam comprises such an optical device.

20 Claims, 7 Drawing Sheets

(51) Int. Cl.
    *H01S 3/00*        (2006.01)
    *H01S 3/23*        (2006.01)

(56) References Cited

U.S. PATENT DOCUMENTS

| | | | |
|---|---|---|---|
| 9,945,731 B1 | 4/2018 | Efimov et al. | |
| 2007/0201795 A1* | 8/2007 | Rice ................. | H01S 3/005 385/39 |
| 2008/0084605 A1* | 4/2008 | Rothenberg ......... | B23K 26/067 359/337.21 |
| 2017/0010463 A1 | 1/2017 | Morizur et al. | |

OTHER PUBLICATIONS

Carpenter et al., Multi-Plane Light Conversion with Low Plane Count, 2017 Conference on Lasers and Electro-Optics Europe & European Quantum Electronics Conference, IEEE, (Jun. 25, 2017), p. 1.
International Search Report for International Application No. PCT/EP2020/052738 dated May 11, 2020, 3 pages.
International Written Opinion for International Application No. PCT/EP2020/052738 dated May 11, 2020, 6 pages.
Labroille et al., Mode Selective 10 Mode Multiplexer Based on Multi-Plane Light Conversion, Optical Fiber Communication Conference 2016, (Mar. 20-22, 2016), 3 pages.
Morizur et al., Programmable Unitary Spatial Mode Manipulation, J. Opt. Soc. Am. A vol. 27, No. 11, (Nov. 2010), pp. 2524-2531.

\* cited by examiner

OPTICAL DEVICE COMBINING A PLURALITY OF BEAMS AND SYSTEM USING SAME

CROSS-REFERENCE TO RELATED APPLICATIONS

This application is a national phase entry under 35 U.S.C. § 371 of International Patent Application PCT/EP2020/052738, filed Feb. 4, 2020, designating the United States of America and published as International Patent Publication WO 2020/161126 A1 on Aug. 13, 2020, which claims the benefit under Article 8 of the Patent Cooperation Treaty to French Patent Application Serial No. 1901034, filed Feb. 4, 2019.

TECHNICAL FIELD

The present disclosure relates to an optical device for forming a light beam by combining a plurality of input light beams. It also relates to a system for producing an output light beam, comprising a light source producing a plurality of beams that are associated with an optical device of this kind.

BACKGROUND

In the field of optics, it is sometimes desirable to combine a plurality of light beams, for example, originating from a plurality of laser sources arranged in a matrix, in order to form a single light beam having an increased power. This combination can be achieved, for example, starting from coherent light beams or beams having stepped spectra. It is also desirable to maintain the quality of the combined beam, and, in particular, the divergence thereof. This is of importance, in particular, when the combined beam is intended to illuminate a target arranged in the far field.

Thus, document WO2007100752 discloses a device for coherent combination, in which an optical element arranges a plurality of phase-locked beams, relative to one another, such that they project according to selected angles on a diffractive network, which results in the combination of the beams. When the locking of the beams is not perfect (which is virtually never the case), the quality of the combined beam is not selected or controlled. In this case, the beam tends to comprise components according to the higher orders of diffraction of the network, and thus to form a discrete beam, i.e., one that is not spatially concentrated, which is not always desirable.

The product "TILBA" by the company Cailabs is also known, which product implements a multi-plane light conversion device for combining a plurality of mutually coherent beams. The device is designed to implement a modal conversion that transforms input modes, corresponding, respectively, to the lobes of the plurality of beams, into a Gaussian output mode. During the modal conversion implemented by the device, all the energy of the incident radiation (formed by the plurality of light beams) present in the input mode is transported into the Gaussian output mode.

However, it is particularly tricky to obtain and to maintain the perfect coherence of the beams at the input of the conversion device, for example, below a threshold value of 0.5 rad rms. This is, in particular, the case when the number of beams is significant; for example, greater than 10.

When the input beams are not perfectly coherent or, to a lesser extent, when the intensities of the input beams are not equal to one another, the modal transformation performed by the device is not perfectly controlled, which may result in a deterioration of the quality of the combined beam, for example, by increasing its divergence or causing its tip to deviate. In other words, the energy of the incident radiation will not be transported entirely into the sought output mode. A portion of the energy may be absorbed or diffused by the conversion device, and/or form a combined beam having low-intensity radiation combined with a diffuse halo.

BRIEF SUMMARY

The aim of the present disclosure is that of overcoming the above-mentioned disadvantages, at least in part. More precisely, an aim of the present disclosure is that of forming a combined beam, the properties of which are controlled, even when the input beams are not mutually coherent, and/or when the intensities thereof are different.

In view of achieving this aim, the object of the present disclosure proposes an optical device for forming an output light beam having at least one target mode, by combining a plurality of input light beams that are phase-locked so as to have a predetermined phase difference, collectively forming incident light radiation. The optical device comprises:
  an input plane transverse to the input light beams in which an input mode base is defined, which base is made up of a main supermode formed of a linear combination of primary modes each having a specified phase and amplitude, the primary modes being, respectively, spatially associated with the input light beams, and in which a plurality of interference supermodes are defined; and
  an output plane transverse to the output light beam, in which an output mode base is defined, which base is made up of the target mode and a plurality of deformation modes.

The optical device also comprises a multi-plane light conversion device, comprising a plurality of microstructured zones arranged on at least one optical element in order to intercept and spatially modify the phase of the incident light radiation during a plurality of reflections or transmissions separated by free propagation, the multi-plane light conversion device arranged between the input plane and the output plane, and the microstructuring of the plurality of microstructured zones being designed to carry out a modal conversion of the incident radiation and to prepare transformed radiation, the modal conversion aiming to transport the part of the incident radiation present in the main supermode into the target mode, and aiming to transport the part of the energy of the incident radiation present in the interference supermodes into the deformation modes.

According to other advantageous and non-limiting features of the present disclosure, taken individually or in any technically possible combination:
  the input light beams are distributed in a linear manner in strips, according to a single direction of the input plane, or in a matrix, or in a hexagon, according to two directions of the input plane;
  the supermodes of the input base are all of the same intensity;
  the target mode is selected from the list consisting of a Gaussian mode, a "top-hat" mode, in far field or in near field, having a circular, rectangular, or square shape;
  the input base comprises N-1 interference supermodes, an interference supermode of the order k, $2<=k<=N$ being defined as the product, at any point of the input plane $(x, y)$, of the main supermode with the Walsh function of the order k, $W_k(x, y)$;

the optical device comprises a modal filtering device integrated in the conversion device or arranged between the input plane and the conversion device, for eliminating the secondary modes of the input light beams;

the deformation modes are spatially superimposed on the target mode in the output plane, and the output light beam is formed entirely of the radiation transformed by the conversion device;

the deformation modes are spatially separated from the target mode in the output plane, and the output light beam is formed exclusively of the part of the radiation transformed in the target mode by the conversion device;

the deformation modes are spatially separated from one another, and the device also forms complementary output light beams formed, respectively, of the part of the radiation transformed in the deformation modes by the conversion device;

the deformation modes comprise a portion that is spatially superimposed on the target mode, and another portion of the deformation modes being spatially separated from the target mode; and the portions of the deformation modes that are spatially separated from the target mode are also spatially separated from one another, and form complementary output light beams.

According to another aspect, the object of the present disclosure proposes a system for producing an output light beam, comprising:

at least one source producing a plurality of phase-locked beams;

a device for controlling the phase of the plurality of beams; and an optical device as defined above, the optical device being arranged downstream of the source so as to bring the plurality of beams into optical correspondence with the primary modes of the main supermode of the input plane of the device.

According to other advantageous and non-limiting features of this aspect of the present disclosure, taken individually or in any technically possible combination:

the control device is designed to lock the phase of the plurality of beams to a mutual phase shift setpoint corresponding to the mutual phase shift of the primary modes of the main supermode;

the control device is designed to lock the phase of the plurality of beams to a mutual phase shift setpoint that is managed so as to change the shape of the output beam; and the output light beam is intended to illuminate a target in far field, and the production system comprises at least one detector for detecting radiation reflected by the target, the detector being connected to the control device.

BRIEF DESCRIPTION OF THE DRAWINGS

Other features and advantages of the present disclosure will become clear from the following detailed description of the present disclosure, with reference to the accompanying drawings, in which.

DETAILED DESCRIPTION

For the purpose of clarity, in the present disclosure light radiation is defined as radiation formed of at least one mode of the electromagnetic field, each mode forming a spatial-frequency distribution of the amplitude, the phase, and the polarization of the field. Therefore, the modification or transformation of the phase of the light radiation denotes the spatial-frequency modification or transformation of each of the radiation modes.

The "shape" of radiation denotes the transverse distribution of the amplitude and of the phase of the mode or the combination of the transverse distributions of amplitude and phase of the modes forming the radiation.

For the purpose of simplification, it will be considered, in the present description, that the radiation is polarized according to a single direction, and has a single frequency. However, the principles set out are entirely applicable to radiation having more than one polarization direction or more than just a single frequency.

In a very general manner, an optical device according to the present description implements means capable of modifying the shape of light radiation, as this term has been defined above. This modification can be described precisely in a modal form, i.e., as defining how the input modes of a family of modes defined in a transverse input plane are transformed into output modes of a family of output modes defined in a transverse output plane. The family of input and output modes generally form orthonormal bases and make it possible to break down any light radiation.

A transformation of this kind, described in modal form, can be implemented by different types of conversion devices. It may therefore be a device using phase modulators and beam splitters, as described in the document by Ryf, Roland, et al. "Mode-Division Multiplexing Over 96 km of Few-Mode Fiber Using Coherent 6*6 MIMO Processing," *Journal of Lightwave technology* 30.4 (2012): 521-531.

A unitary modal transformation can also be carried out by the multi-plane light conversion device, more typically referred to as a "multi-plane light converter" (MPLC).

For the sake of completeness, it is noted that, in a device of this kind, incident light radiation undergoes a succession of reflections and/or transmissions, each reflection and/or transmission being followed by a propagation of the radiation in free space. At least some of the optical parts on which the reflections and/or the transmissions take place, and that guide the propagation of the incident radiation, have a microstructured surface that modifies the incident light radiation.

"Microstructured surface" means that the surface of the optical part comprises a relief, which may be broken down, for example, in the form of "pixels," the dimensions of which are between a few microns and a few hundred microns. The relief or each pixel of the relief has an elevation that is variable with respect to a median plane defining the surface in question, of at most a few microns or at most a few hundred microns. An optical part having a microstructured surface of this kind forms a phase mask that introduces a local phase shift within the transverse cross section of the radiation that is reflected or transmitted there.

Thus, light radiation that propagates within an MPLC device undergoes a succession of local phase shifts, separated by propagations. The succession of these elementary transformations (for example, at least four successive transformations such as 8, 10, 12, 14, or even at least 20 transformations) establishes an overall transformation of the spatial profile of the incident radiation. It is thus possible to design the microstructured reflection or transmission surfaces to transform a first light radiation, which, in particular, is of a specific shape, into a second radiation of a different shape.

The theoretical foundations, and practical examples of implementation of an MPLC device, can be found in the documents "*Programmable unitary spatial mode manipulation,*" Morizur et Al, *J. Opt. Soc. Am. A*/Vol. 27, No. 11/Nov. 2010; N. Fontaine et Al, (ECOC, 2017), "Design of High Order Mode-Multiplexers using Multiplane Light Conversion"; U.S. Pat. No. 9,250,454 and US2017010463.

Figure 1:
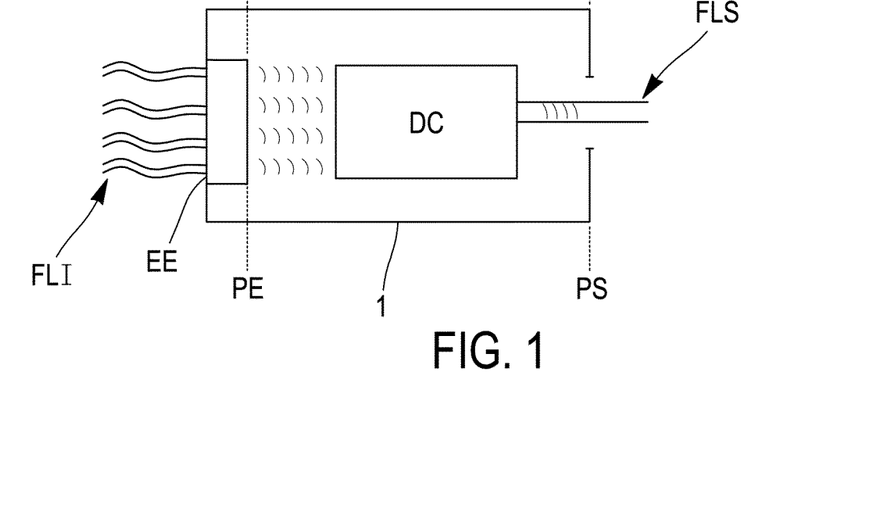
FIG. 1 shows an optical device according to the present disclosure.

Returning to the object of the present description, and with reference to FIG. 1, it is sought to achieve a passive optical device 1 combining a plurality of input light beams FLI that are phase-locked to have a predetermined phase difference, collectively forming incident light radiation in an output light beam FLS having a target mode. The input light beams FLI are substantially mutually parallel, such that a transverse plane exists that is secant to them all. The transformation of the incident light radiation is achieved by means of a conversion device DC. The optical device 1 may also comprise other output light beams, referred to as complementary light beams, not shown in FIG. 1. The complementary light beams, when present, are spatially separated from the output light beam.

As is described in detail in the remainder of this description, when the input light beams FLI are perfectly mutually coherent, such that they have a predetermined phase shift therebetween and a corresponding intensity, all the energy of the incident radiation is transported into the target mode.

"Target mode" refers to a mode that is selected in advance for the needs of the desired application. This may be a Gaussian mode, a "top-hat" mode, which is circular, rectangular, or square (it being possible for these three latter modes to be defined in far field or in near field).

However, and as has been set out in the introduction of the present disclosure, it is generally not possible to ensure a perfect predetermined phase shift of the input beams. To a lesser extent, the control of the intensity of each beam may also be imperfect. It is thus desirable to control the manner in which the output light beam will be formed in these cases, which the present description aims to address by applying a modal approach to this problem. This approach aims to design the conversion device DC configured to associate the suitable modes selected from an input mode base and an output mode base.

For this purpose, an input plane PE is positioned transversely to the input light beams FLI, and an output plane PS is positioned transversely to the output light beam FLS, in order to be able to describe, respectively, the incident radiation and the transformed radiation, and to define the transformation that will be performed by the conversion device DC arranged between the two planes.

Input Base

In the input plane PE, a family of input modes is defined, which modes, preferably, form an orthonormal basis of the incident light radiation, formed of a main supermode and interference supermodes.

The main supermode is itself formed by a coherent combination of primary modes, and the intensity thereof corresponds to the sum of the intensities of the primary modes. In other words, the main supermode is a linear combination of the primary modes. The primary modes correspond to the modes of the input beams. Each primary mode is thus spatially associated with an input beam FLI, i.e., it has a lobe that is arranged spatially at the intersection of the beam and the input plane. The beams may be monomode or multimode. Therefore, in the main supermode, there are at least as many primary modes as input beams FLI.

The primary modes of the main supermode are not necessarily all identical to one another, and they each have a specified phase and amplitude. In the preferred use cases, the input beams are prepared so as to be identical, and all have the same intensity profile. Consequently, in these use cases, the primary mode or the primary modes associated with an input beam is (are) identical from one beam to another. The primary modes of the main supermode have a predetermined phase shift with respect to one another (which phase shift may be zero), such that when the input beams FLI have this phase shift with respect to one another, they are thus projected perfectly in the main supermode.

Of course, in order to ensure this perfect projection, it is also important for the input beams FLI to have an intensity that corresponds, in the input plane, to the intensities of the primary modes with which they are associated. However, in a general manner, a device according to the present disclosure is much less sensitive to an intensity gap, which can be easily adjusted, than to a phase gap, which is thus the main concern of the present description.

In order to maintain the generality of this description, without excessively complicating it, it is noted that the input light beams are "locked" when they exhibit selected predetermined phase shifts therebetween, it being possible for the phase shifts to be damaging or not damaging, and for them to have an intensity profile that is consistent with the intensity profile defined by the primary modes of the main supermode.

The input base is also formed of a plurality of interference supermodes. The supermodes aim to represent the components of the input light beams FLI that are not projected perfectly in the main supermode. The input mode base thus makes it possible to break down the incident light radiation as the combination of the main supermode, for the "locked" part of the input beams FLI, and the interference supermodes for the non-"locked" part of the beams.

The interference supermodes can be formed proceeding from the main supermode, some of the primary modes of an interference supermode being phase-shifted with respect to these same primary modes of the main supermode. In a more general manner, in a device having N primary modes, the main supermode is completed by N-1 interference supermodes, each formed by a complex linear combination of the primary modes, so as to form the input orthonormal basis. In the preferred cases of use, in which the primary modes all have the same intensity profile, the interference supermodes can thus all have the same intensity profile as the main supermode, and are distinguished only by their phase profile.

Figure 2:
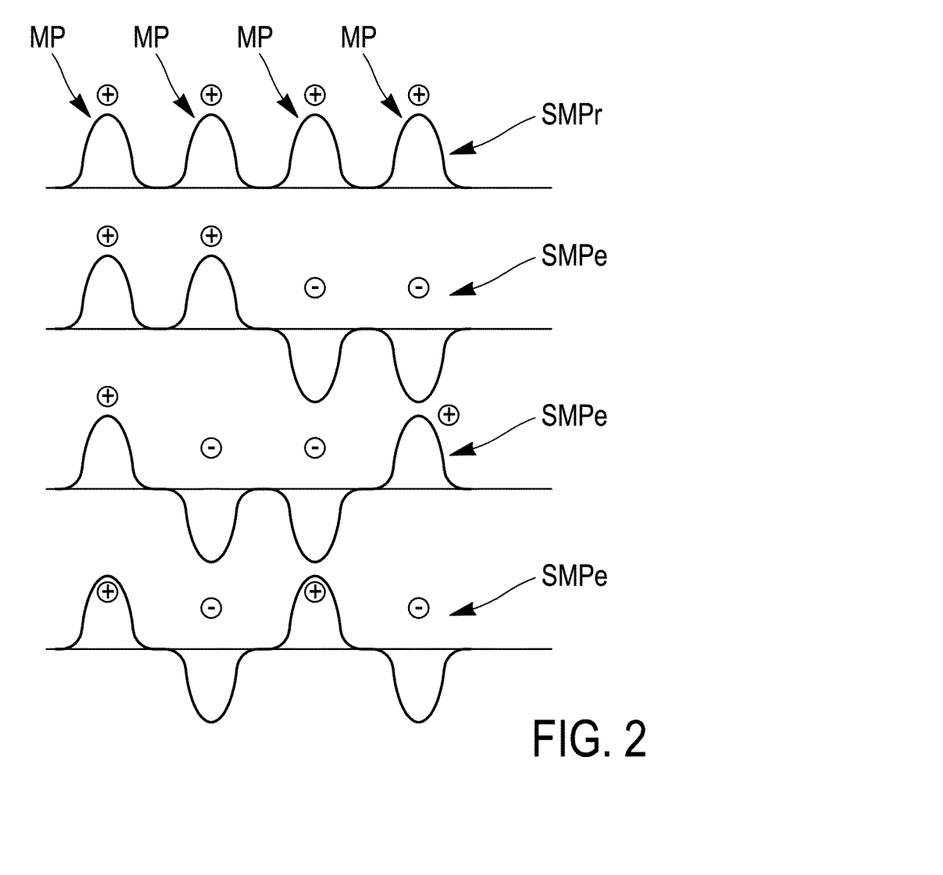
FIG. 2 shows an example of a family of input modes that makes it possible to design an optical device according to the present disclosure.

FIG. 2 thus shows the intensity of a main supermode SMPr according to an axis X of the input plane PE. In this case, the main supermode SMPr is made up of four primary modes MP that are uniformly distributed according to the X axis, each primary mode MP being Gaussian in this case. Underneath the main supermode SMPr, FIG. 2 shows examples of interference supermodes SMPe. Each of the interference modes SMPe comprises primary modes MP that are identical to those of the main supermode SMPr (referred to by "+" in FIG. 2) and at least one primary mode MP (referred to by "−" in FIG. 2) having a phase opposite that of the corresponding primary mode MP in the main supermode SMPr. The four supermodes of FIG. 2 thus form a family of input modes that can be used to design a conversion device that is compatible with the present description.

In a more general manner, and when the device aims to combine N equidistant input light beams distributed along an axis X, the main supermode comprises N primary modes. If the primary modes are of the same intensity, it is also possible to express N-1 interference supermodes of the order k (k=2 to N), an interference supermode of the order k being defined as the product of the main supermode with the Walsh function $W_k(x)$.

Figure 3:
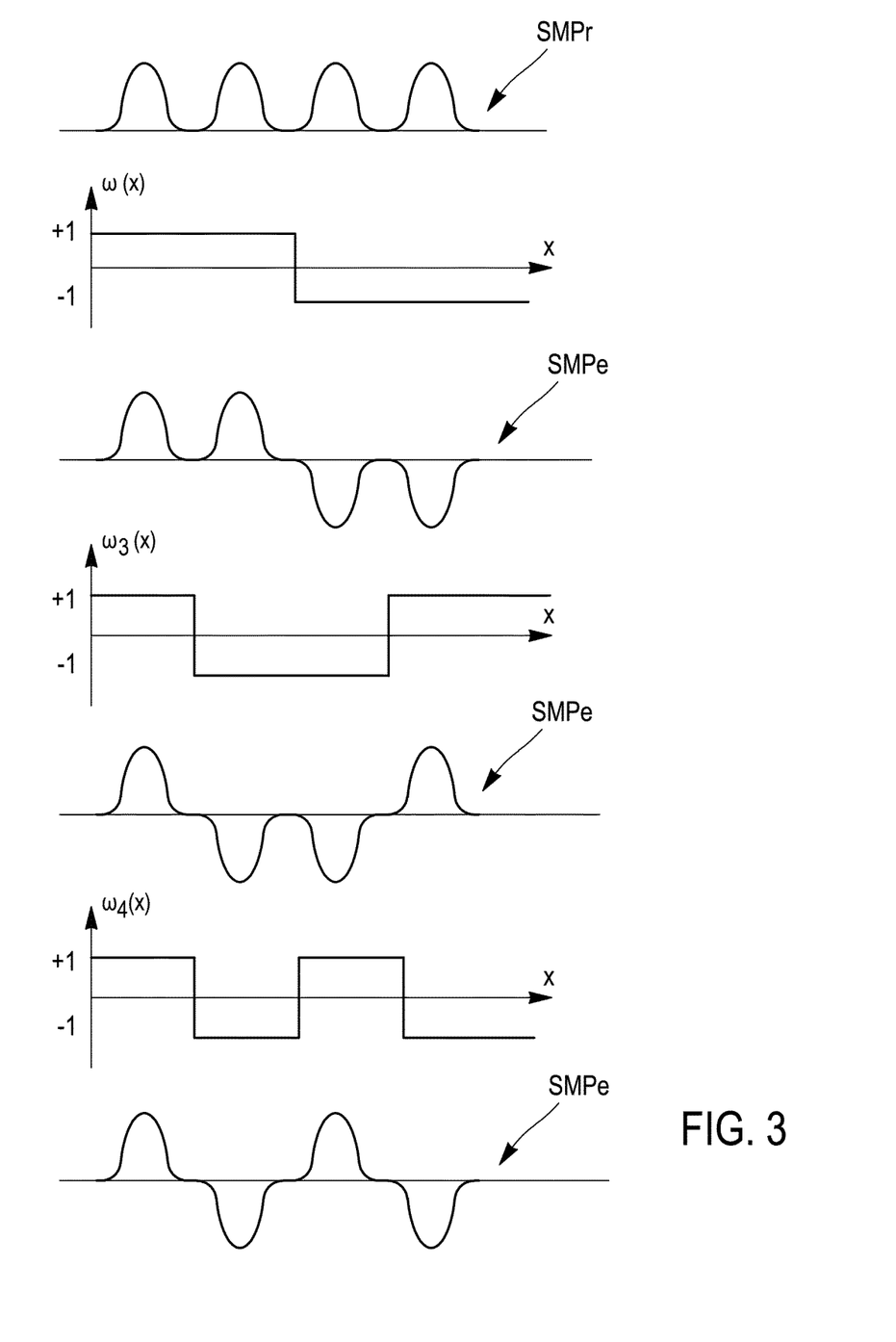
FIG. 3 shows a method for designing a family of input modes based on the Walsh functions.

FIG. 3 thus shows a main supermode SMPr that is identical to that described in relation to FIG. 2, made up of four equidistant Gaussian primary modes, and three interference supermodes SMPe1, SMPe2, SMPe3 that originate, respectively, from the product of the main supermode SMPr with the Walsh function $W_k(x)$, for k=2, 3 and 4. This principle makes it possible to establish a family of input supermodes that can be generalized when the primary modes are distributed in a matrix in the input plane provided with a Cartesian reference point, this tie using the two-dimensional Walsh functions $W_k(x, y)$ defined in this plane as the product of one-dimensional Walsh functions according to the x and y axes.

Output Base

In the output plane, a family of output modes is defined, preferably, an orthonormal basis. This base comprises the target mode that will contribute to making up the output beam FLS and a plurality of deformation modes. The output base comprises as many deformation modes as there are interference supermodes in the input base. By way of example, the target mode can be selected so as to be Gaussian, and the deformation modes can be Hermite-Gauss modes of successive orders. However, the present disclosure is in no way limited to this selection, and it is possible to select the type of the target mode and the deformation modes, as needed.

The deformation modes can be arranged in the output plane PS according to a plurality of embodiments, the embodiments corresponding to particular use cases of the optical device 1.

Figure 4:
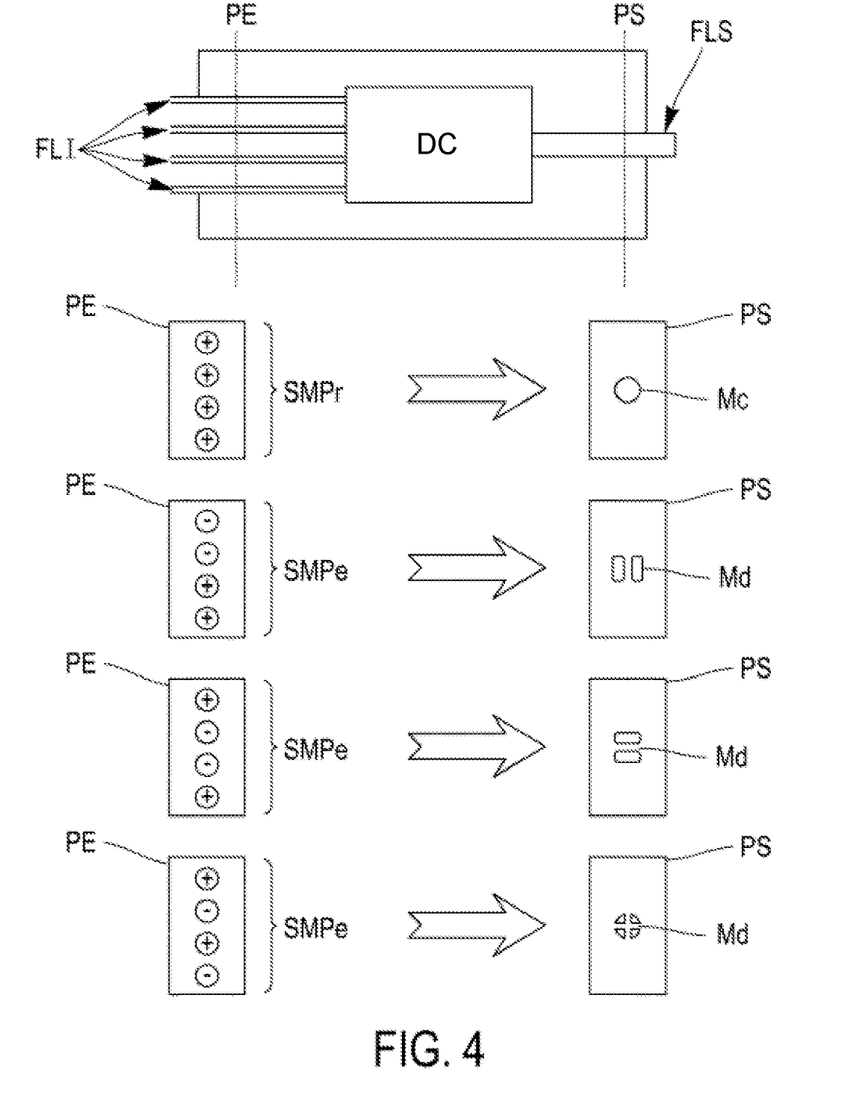
FIG. 4 shows a first configuration of the spatial arrangement of the deformation modes of the output base.

According to a first embodiment shown in FIG. 4, the deformation modes Md are spatially superimposed on the target mode Mc in the output plane PS. More precisely, the deformation modes cover the target mode at least in part, it nonetheless being possible for a portion of the deformation mode to extend beyond the target mode. In this case, the output light beam FLS is formed entirely of the radiation transformed by the conversion device DC, and the part of the energy of the incident radiation that is not found in the main supermode is nonetheless transported by the conversion device DC in order to be spatially concentrated in the region of the target mode Mc. This embodiment is advantageous in that the energy of the output beam FLS does indeed remain concentrated around the target mode Mc, even if the input light beams FLI are not locked, i.e., they have phase and/or intensity gaps therebetween that differ from those defined by the main supermode SMPr. However, it can nonetheless result in slight misalignment or distortion of the output light beam FLS according to the deformation modes Md effectively illuminated by the input light beams FLI. This effect can be taken advantage of in some embodiments of the optical device 1, as will be set out later in this description.

Figure 5:
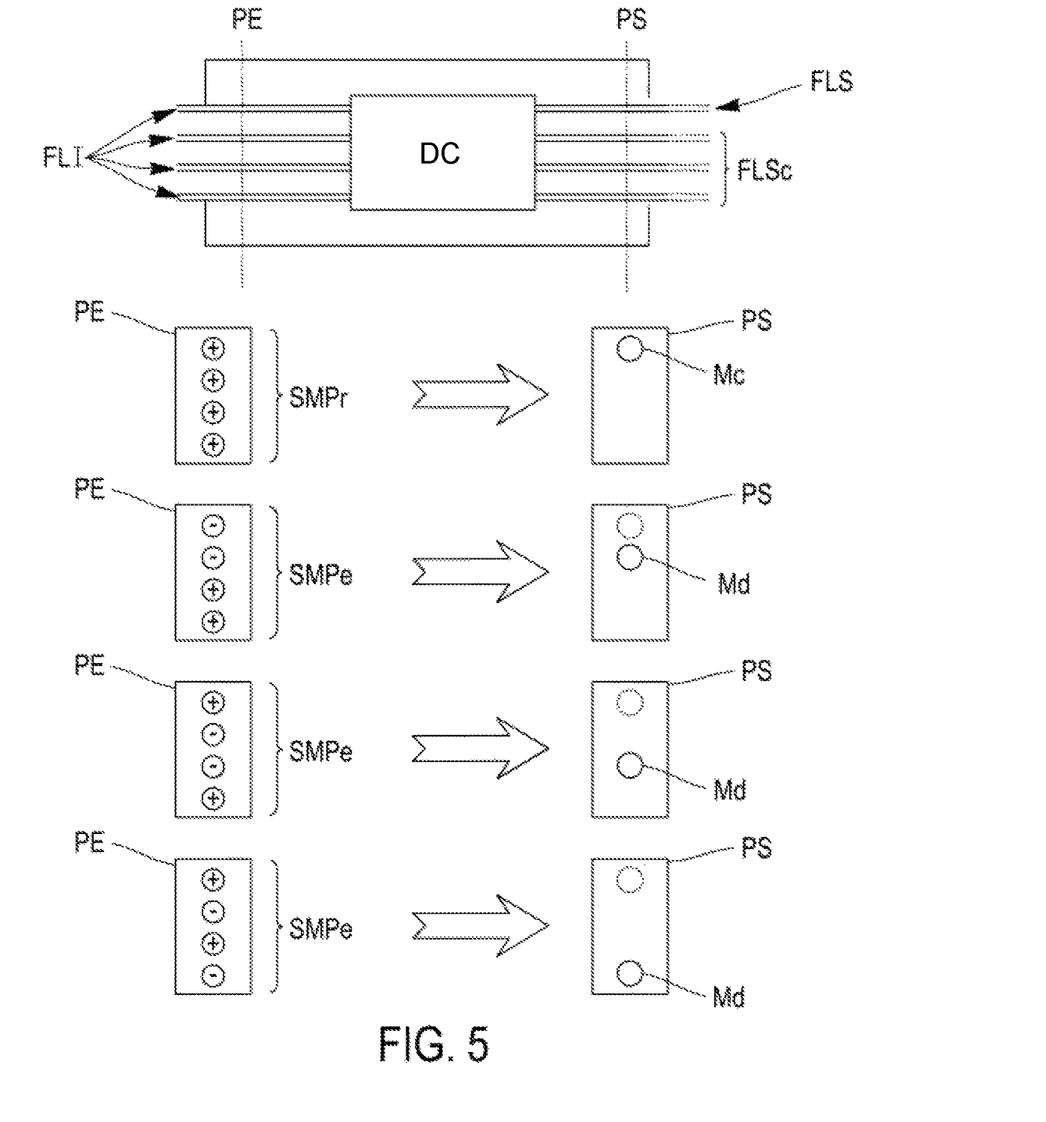
FIG. 5 shows a second configuration of the spatial arrangement of the deformation modes of the output base.

According to a second embodiment shown in FIG. 5, the deformation modes Md are spatially separated from the target mode Mc in the output plane Ps. In this case, the output light beam FLS is formed exclusively of the part of the radiation transformed in the target mode Mc by the conversion device MC. The deformation modes can contribute to forming at least one complementary output beam FLSc.

As is apparent in FIG. 5, the deformation modes Md can be separated from one another in the output plane PS, and thus as many complementary output beams FLSc are formed. However, this does not form an essential feature of this embodiment, and it is possible to envisage that the deformation modes cover one another, at least in part, in order to form, for example, a single or a limited number of complementary output beams FLSc.

When the input light beams FLI are not locked and have phase and/or intensity gaps therebetween that differ from those defined by the main supermode SMPr, and the incident radiation thus comprises at least one component according to one of the interference supermodes SMPe, the conversion device DC illuminates the associated deformation mode or modes Md. The resulting complementary output light beam FLSc, or a plurality of such beams, can be detected and used, for example, in order to lock the input light beams FLI relative to one another. It is alternatively possible to select to block the light radiation, by diffusion or absorption.

This embodiment has the advantage of forming an output beam FLS that is formed exclusively of the target mode, and thus has a constant and perfectly controlled shape even when the input light beams FLI have variable or poorly controlled characteristics. However, in this case the energy of the incident light radiation is not entirely transported into the output light beam FLS.

Figure 6:
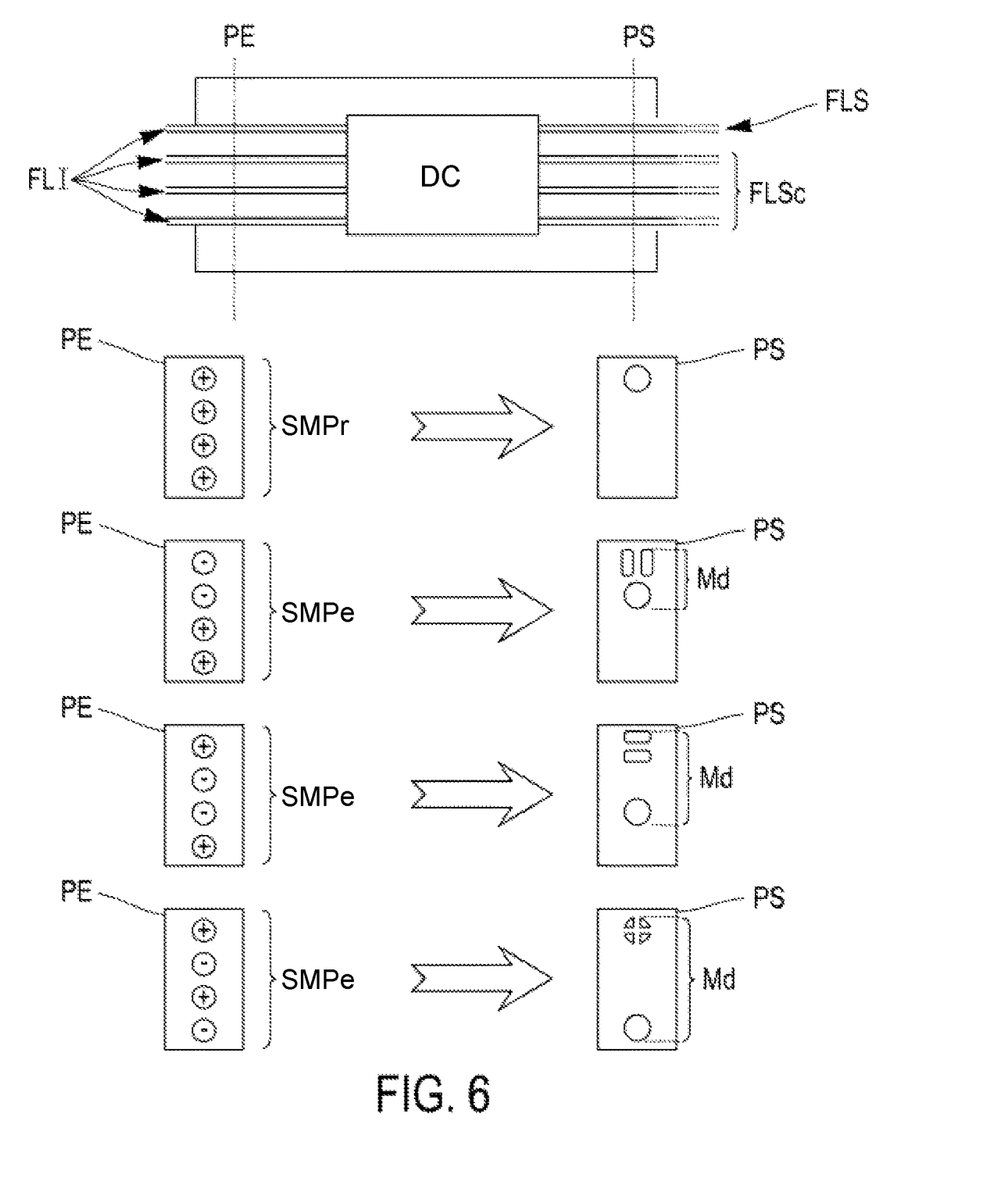
FIG. 6 shows a third configuration of the spatial arrangement of the deformation modes of the output base.

According to a third approach, referred to as "hybrid" and shown in FIG. 6, the deformation modes Md are defined such that they comprise a portion that is spatially superimposed on the target mode Mc, and a portion that is spatially separated from the target mode Mc.

By way of example, it is possible to form a collection of deformation modes Mc such that a portion 1-α of the energy of each mode is placed in a distinct mode, for example, a Hermite-Gauss mode, centered on the target mode, and such that the complementary portion α of the energy of each mode is placed in a mode, for example, Gaussian, that is spatially separated from the target mode Mc.

This embodiment, which is a hybrid between the first and the second embodiment of the deformation modes, makes it possible to make the most of these embodiments. α is preferably selected so as to be small, for example, less than 0.01, in order to transport the majority of the energy of the incident radiation toward the output beam FLS. Thus, a small complementary portion of the energy is retained, in order to form the complementary light beam FLSc or a plurality of such beams. It is possible, for example, to make use of the complementary portion of energy in order to attempt to lock the phase and/or intensity of the input light beams and to compensate the misalignments and other forms of aberration that may appear in the output light beam FLS when the first embodiment is implemented.

Conversion Device

In order to perfectly control the manner in which the optical device 1 forms the output light beam FLS by combining the input light beams FLI, a conversion device DC is provided, the function of which is to associate, one-to-one, the modes of the input base with the modes of the output base.

As is shown in FIGS. 3 to 5 for each of the preferred embodiments of the deformation modes Md, the conversion device DC is designed to associate the main supermode SMPr with the target mode Mc. The main function of the optical device 1 is thus achieved, i.e., combining the "locked" input light beams FLI in order to form the output beam FLS.

The conversion device is also designed to associate the interference supermodes SMPe with the deformation modes Md. It is thus ensured that, in the case of the input light beams FLI not being "locked," the incident radiation does not propagate in an uncontrolled manner in the optical device 1, but is guided according to the selected deformation modes. In this way, the characteristics of the output beam are controlled. In a general manner, a conversion device can associate any interference supermode SMPe with any deformation mode Md, insofar as, of course, the modes indeed form bases as specified above.

When the deformation modes Md are selected according to the first or the third embodiment, to be spatially superimposed, at least in part, on the target mode Mc, it is possible to specifically select to associate particular interference supermodes SMPe with particular deformation modes Md in order to seek to control the aberrations of the output beam FLI that may sometimes occur in these embodiments.

The conversion device DC can be designed to apply other processing steps in addition to those that have just been set out, and/or the optical device 1 may comprise, upstream or downstream of the conversion device DC, other optical elements for implementing the other processing steps.

It is thus possible to provide optical elements (for example, a telescope), for shaping (convergence, focusing) of the output beam FLS and/or of the complementary output light beams FLSc, downstream of the input plane of the conversion device DC.

In an additional example, the conversion device DC may be designed to perform modal filtering of at least some of the input light beams, in addition to the shaping of the output beam FLS. This processing can be useful, for example, when the input beam is formed of a high-power fiber laser source. It is known that, in this case, the energy of the beam tends to be distributed between a "useful" main mode of the fiber, and secondary modes that are not desired. It is possible to configure the conversion device such that it spatially separates this main mode from the secondary modes. The radiation associated with the secondary modes can subsequently be blocked, for example, by diffusion or by absorption. The radiation associated with the main mode contributes to forming the incident radiation that will be processed modally in order to form the output light beam. The conversion device DC is provided with an element for blocking, absorbing and/or eliminating the radiation corresponding to the secondary modes (in order that they do not contribute to forming the output beam), and is designed and configured to form filtered incident radiation of the secondary modes.

The modal filtering device can be integrated in the conversion device DC, as has just been described, or may be separate from the conversion device. In this latter case, the filtering device is arranged in the optical device 1, between the input plane PE and the conversion device DC.

Advantageously, the input and output bases are established such that the supermodes and modes making them up have the feature of being of separable spatial variables. In the input and output planes, provided, respectively, with a Cartesian reference point (x, y), a feature of this kind amounts to arranging the modes and the supermodes, and to verifying that pairs of indices (i, j) and functions $f_i(x)$ and $g_j(y)$ exist such that, for each mode/supermode $M_{ij}$, it is possible to establish $M_{ij}(x, y) = f_i(x) \cdot g_j(y)$.

When this property is indeed present, and the conversion device DC is designed to associate the supermodes of the input base with the modes of the output base having the same pairs of indices, it is demonstrated that it is possible to greatly simplify the design of the conversion device, in particular, when this is implemented by a multi-plane conversion device. An approach of this kind is described in the document "*Fabrication and Characterization of a Mode-selective 45-Mode Spatial Multiplexer based on Multi-Plane Light Conversion,*" Bade et al, *Optical Fiber Communication Conference Postdeadline Papers, OSA Technical Digest, Optical Society of America*, 2018, paper Th4B.3, pp. 1-3, and in the French patent application 1851664.

Once the preliminary design steps have been carried out, i.e., the input and output mode bases have been laid down, and the modal transformation of the input modes into the output modes has been carried out, an optical device 1 according to the present description can be implemented by means of a conversion device MC in the form of, for example, an MPLC or multiplexers making use of the phase plates and the beam splitters.

Figure 7:
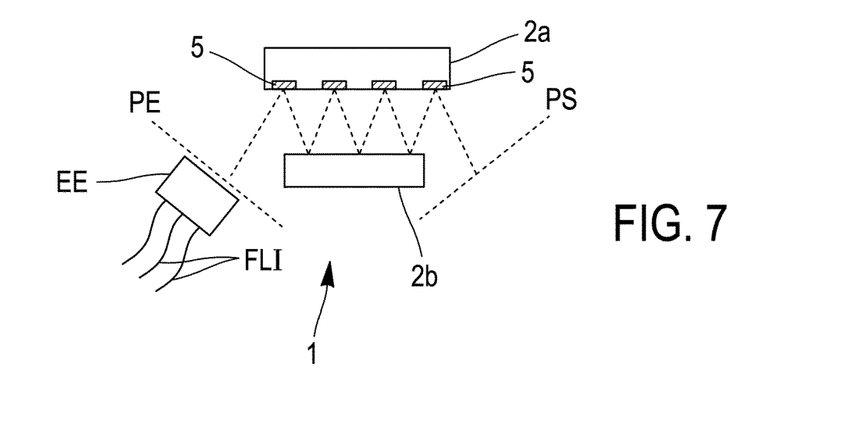
FIG. 7 shows a conversion device of an optical device according to the present disclosure.

With reference to FIG. 7 and by way of example, an MPLC device is shown, which may form a conversion device DC of an optical device according to the present disclosure. In the architecture shown, the MPLC is formed of two reflective optical parts 2a, 2b, arranged opposite one another. One of the parts bears microstructured phase masks 5. Thus, a multi-passage cavity is formed, in which the incident radiation is reflected and phase-shifted a plurality of times in the region of each mask 5, in order to form the transformed radiation. In this case, the phase masks are all borne by a phase plate 2a comprising microstructured zones forming the masks 5, the second optical part 2b being a simple mirror.

Once the architecture thereof has been laid down, the implementation of the conversion device MPLC is continued by determining the phase profile of each mask 5 (the microstructuring thereof) that results in the desired modal conversion (for example, that shown in any of FIGS. 4 to 6) being applied to the incident light radiation. The conversion device MPLC is thus capable of preparing the transformed light radiation that makes it possible to form the output light beam.

The documents cited in the introduction of this detailed description disclose, in detail, the digital design methods that can be used for determining the phase profile of each phase mask 5. The phase masks can then be achieved using the established digital model, for example, by etching, or by photolithography, of the optical part bearing them, in order to provide it with a microstructure. The microstructuring with which the optical parts are provided configures the selected architecture of the MPLC such that it implements the desired modal transformation. It will be noted that this microstructuring is unique to the input and output base, and to the modal transformation, defined above, that have been used for the digital design of the microstructuring.

Similar design principles could be applied in order to implement the conversion device DC in the form of a device using beam splitters.

Whatever the mode selected for implementing the conversion device DC, the device is designed to carry out a modal conversion of the incident light radiation, and to thus prepare a transformed light radiation. The modal conversion aims to transport the portion of energy of the incident radiation present in the main supermode into the target mode, and to transport the portion of energy of incident radiation present in the interference supermodes into the deformation modes.

The conversion device is arranged between the input plane PE and the output plane PS in which the mode bases have been defined. The planes can be realized by optical input and/or output stages. By way of example, and as shown in the schematic drawing of FIG. 1, the optical input stage EE can be formed of a beam of optical fibers that allow for the input light beams FLI to be positioned opposite the rest of the optical device 1. As has been specified above, the output stage may comprise optical elements for shaping the output beam and/or complementary output beams. However, the input and/or output plane can also be formed of a fictional plane transverse to the input or output beams, which in this case propagates freely.

The input light beams FLI can be distributed, in the input plane PE, in a single direction, in strips. They can also be distributed in this plane PE according to two directions, in a matrix or according to a hexagonal distribution. It is possible to provide any number of such beams, for example, from 2 to 10, more than 10, or even several tens.

Applications

With reference to FIGS. 8 to 11, systems for producing an output light beam FLS are shown, which systems implement the optical device 1 that has just been described. The systems comprise at least one source S that produces the plurality of input beams FLI. The optical device 1 is arranged downstream of the source S to position the input beams FLI to be in optical correspondence with the primary modes of the main supermode defined in the input plane PE. The optical device 1 produces the output beam FLS that, in this case, propagates freely and that can be intended for, for example, illuminating a target C arranged in the far field. The optical device produces one or a plurality of complementary output light beams FLSc, as required.

As has already been mentioned, the input light beams FLI substantially all propagate in the same direction, and can be distributed fairly freely in a plane transverse to the direction, for example, in a manner aligned according to any direction of the plane, or arranged in a matrix or in a hexagon in the plane. In any case, this distribution corresponds precisely to the distribution of the primary modes of the main supermode of the input base of the optical device 1. This arrangement can also be ensured by an entry stage, for example, a beam of optical fibers in the form of a strip, or in two dimensions.

The input beams FLI are phase-locked, i.e., they have a phase gap having a setpoint mutual phase shift (or, in other words, they have a predetermined mutual phase difference) that it is desirable to take to zero. They are also locked in terms of intensity, when the intensity is not naturally stable. For this purpose, the systems for producing an output light beam provide a device CDE for controlling the source.

The setpoint mutual phase shift may correspond to the phase shift existing between the primary modes of the main supermode of the input base. In this case, the input light beams FLI are locked so as to project entirely in the main supermode. However, the setpoint mutual phase shift may also differ from the phase shift existing between the primary modes of the main supermode, in order to bring about an imperfect projection of the input light beams FLI in the main supermode, and to illuminate selected deformation modes of the output base.

Figure 8:
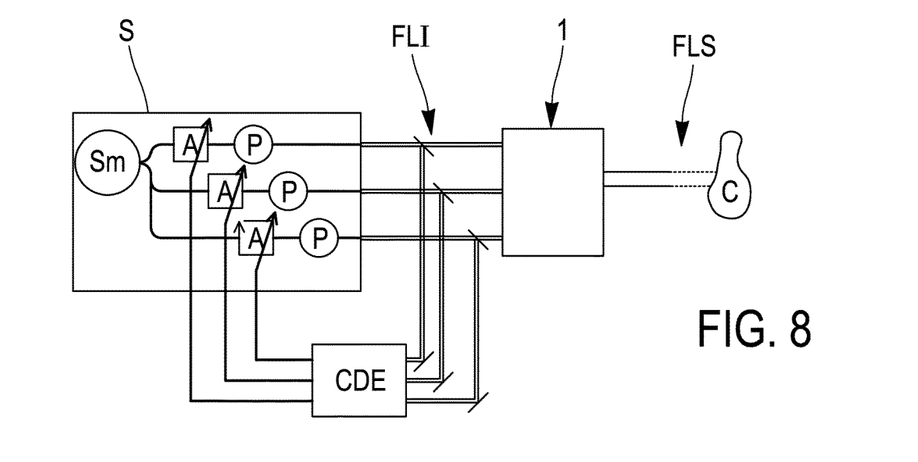
FIG. 8 shows a first architecture of a system for producing an output beam.
Figure 9:
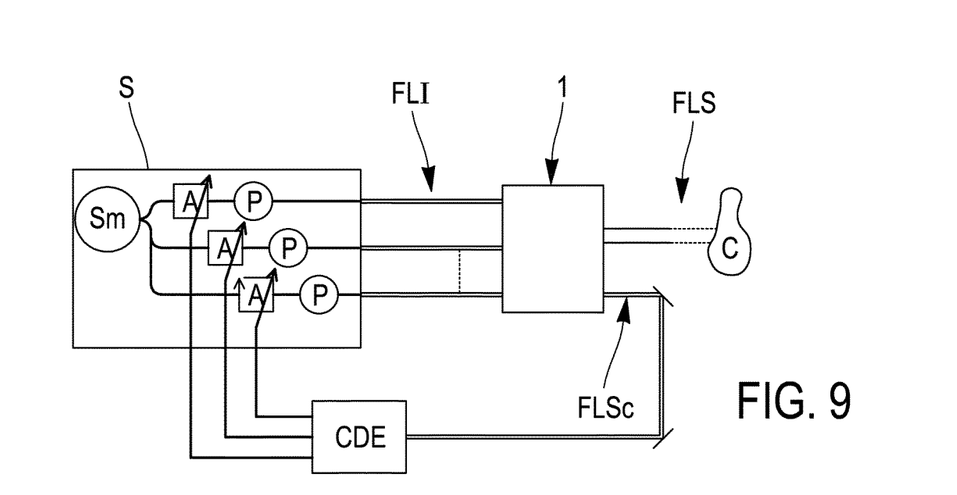
FIG. 9 shows a second architecture of a system for producing an output beam.
Figure 10:
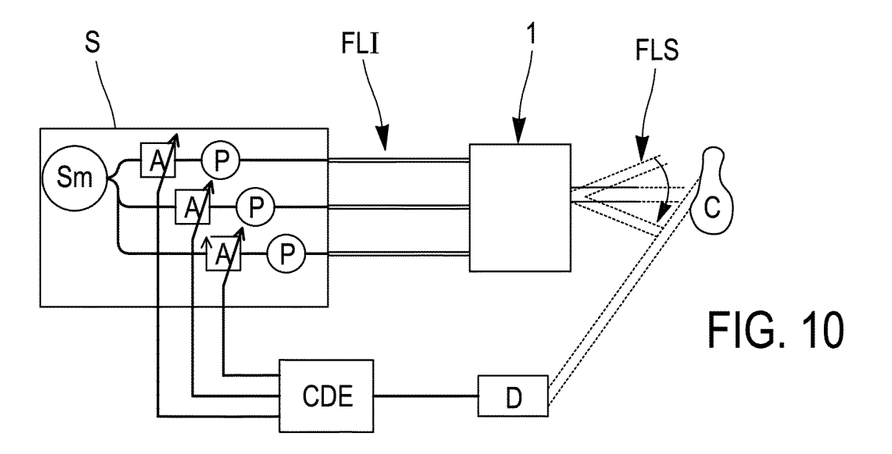
FIG. 10 shows a third architecture of a system for producing an output beam.

In the examples shown in FIGS. 8 to 10, the source S comprises a master source Sm that produces master light radiation. This may be, for example, a laser source. The master source is connected to an optical separator in order to establish the plurality of input beams FLI from the master light radiation. In order to allow for the phase-locking of the input light beams FLI, each beam is coupled to a phase actuator A. The source S may equally also provide an optical amplification stage P associated with each beam to provide the optical device 1 with input light beams FLI that have sufficient energy, and to form a suitable output beam FLS.

The systems for producing output beams, shown in the drawings, also provide a device CDE for controlling the phase of the plurality of beams, which draws up control signals associated, respectively, with the phase actuators of the source S. It would also be possible to provide for it to draw up control signals associated with the amplifiers, if this were to prove to be necessary. For reasons of simplicity, "phase of the plurality of beams" means all the phases of each of the beams.

In a general manner, the control device CDE draws up the control signals for the phase actuators, in order for the input light beams FLI to have the setpoint mutual phase shift. In practice, it is possible to select to use one of the input beams as a reference beam, and to lock the phase of the remaining beams relative to the reference beam. In this case, the control device draws up the control signals for each of the remaining beams only.

The control device CDE may be integrated in the source S or may form a separate device of the production system, separated from the source. In order to draw up the control signals, the control device CDE comprises at least one input that may be connected to various light radiations originated from the production system, depending on the type of locking that is intended to be achieved. As is well known per se, semi-reflective plates, or any other optical element, will be provided to remove a small portion of the light beams and to provide them to the control device CDE. The control device comprises converters or detectors that allow it to process its inputs in a digital or analog manner. The control device CDE also receives an external management device, or, alternatively, it draws up the mutual phase shift setpoint of the input light beams FLI. The control device can be implemented by a signal-processing computer, by means of a programmable logic component (FPGA) or by any other device having sufficient computing power.

Thus, FIG. 8 shows a first possible architecture of a system for producing an output beam. In this architecture, the control device CDE receives, as an input, a portion of each input light beam FLI of the optical device 1, i.e., before the beams are processed by the optical device 1. The control device CDE draws up the control signals for the phase actuators, in order for the input light beams FLI to have the setpoint mutual phase shift.

In the example shown in this drawing, the setpoint mutual phase shift is fixed, and advantageously corresponds to the mutual phase shift existing between the primary modes that make up the main supermode of the optical device 1. It is thus ensured that a maximum amount of energy of the input radiation is transported into the main supermode and, consequently, a maximum amount of energy the output beam.

The embodiment of FIG. 8 is compatible with each of the three embodiments of the deformation modes of the optical device shown with reference to FIGS. 4 to 6. However, it does not take advantage of the complementary output light beams FLSc that the second or the third embodiment may produce.

When the embodiment is associated with the first or the third embodiment, for which the deformation modes are spatially superimposed on the target mode, at least in part, the setpoint mutual phase shift can be managed in order to seek to illuminate at least one deformation mode of the output base. It is thus possible to seek to adjust the tip of the output light beam FLS or, more generally, give it a particular shape or profile. A profile of this kind may make it possible, for example, to compensate for the atmospheric disturbances that tend to change the profile of the beam during its propagation between the production system and the target.

The embodiment of FIG. 8, just like those that will be set out in the remainder of this disclosure, benefits from the advantages of the embodiment of the deformation modes that it implements:

In the case of the first or of the third embodiment, the energy of the output beam is significant and is concentrated around the target mode, whether the input beams are perfectly, imperfectly nor not at all locked.

In the case of the second embodiment or the third embodiment, the shape of the output beam corresponds exactly to that of the target mode, to the detriment of an intensity that may be fluctuating or weak, when the mutual phase shift of the input beams deviates from the mutual phase shift of the primary modes of the main supermode.

Figure 11:
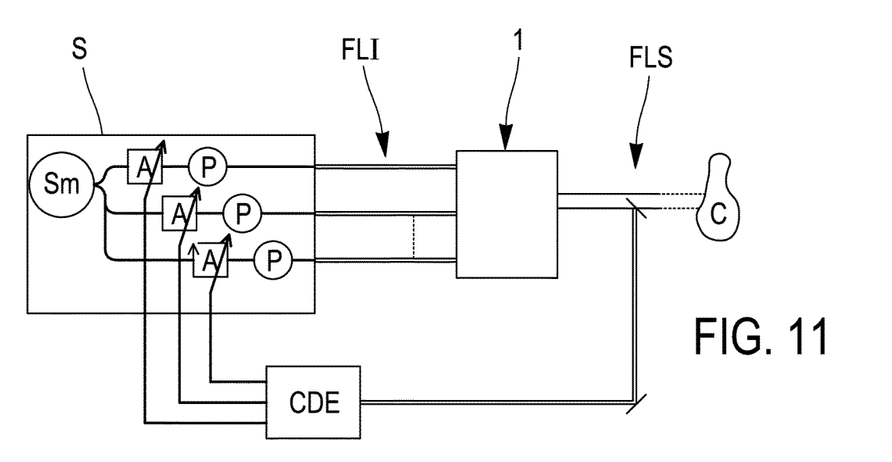
FIG. 11 shows another architecture of a system for producing an output light beam.

FIG. 11 shows another possible architecture of a system for producing an output beam. In this case, the control device CDE receives, as an input, a portion of the output light beam FLS of the optical device 1.

The embodiment of FIG. 11 is compatible with each of the three embodiments of the deformation modes of the optical device shown with reference to FIGS. 4 to 6. However, it does not take advantage of the complementary output light beams FLSc that the second or the third embodiment may produce. When the second embodiment is used, in which the output light beam is made up exclusively of the target mode, the control device CDE can make use of the information on the portion of energy present in the beam (for example, relative to the energy of the incident radiation) in a feedback loop, in order to phase-lock the input beams to the setpoint mutual phase shift.

When the embodiment is associated with the first or the third embodiment, for which the deformation modes are spatially superimposed on the target mode, at least in part, the setpoint mutual phase shift can be managed in order to seek to illuminate at least one deformation mode of the output base. As in the embodiment above, the control device CDE can thus seek to provide the output beam FLS with a particular shape or profile.

FIG. 9 shows a second embodiment of a system for producing an output beam, which is particularly suitable for the second or third embodiment of the deformation modes. The system comprises complementary output light beams FLSc, in this case associated, respectively, with the deformation modes that are not spatially superimposed on the target mode (second embodiment) or with the portion of the deformation modes that are not spatially superimposed on the target mode (third embodiment).

In the example shown in FIG. 9, the complementary output light beams FLSc form inputs of the control device CDE. The device thus has direct access to the deformation modes illuminated by the optical device. It can thus draw up the control signals of the phase actuators in a servo loop seeking to maximize the energy transported into the target mode and/or the portion of the deformation modes that make up the output beam FLS.

When the deformation modes are spatially distributed according to the second embodiment in which the output light beam is formed exclusively of the target mode, it is not possible to change the shape of the output light beam. In this case, it is of little interest to seek to manage the mutual phase shift setpoint, and this is advantageously fixed to correspond to the mutual phase shift of the primary modes of the main supermode.

Vice versa, when the third embodiment of the deformation modes is implemented, in which just one portion of the deformation modes covers the target mode, it is possible, as in the embodiment of FIG. 8, to provide for the mutual phase shift setpoint to be changed in order to adjust the tip, the profile, or more generally the shape, of the output beam FLS. The complementary output light beams FLSc thus allow the control device CDE to precisely determine which deformation modes are illuminated, and at what intensity, which forms information that makes it possible to more precisely control, in a feedback loop, the shape of the output beam FLS.

FIG. 10 shows a third embodiment of the system for producing an output beam according to the present disclosure. This embodiment is compatible with the first or the third embodiment of the deformation modes, according to which at least some of the deformation modes are spatially superimposed on the target mode. As has been seen, it is thus possible to adjust the shape of the output beam, for example, the tip or the profile thereof.

In this third embodiment, the inputs of the control device CDE are coupled to the radiation reflected by the target C. In this case, a detector D is provided, which is arranged relative to the other elements of the system, in a location favorable for receiving the reflected radiation. The detector D can thus provide reliable phase and/or intensity information to the control device CDE. This information relating to the radiation reflected by the target C, in particular, allows the control device CDE to dynamically adjust the tip of the output light beam FLS in order to seek to follow the target.

In a particularly advantageous approach, the detector is integrated in the MPLC that forms the conversion device DC of the optical device 1. A fraction of the reflected radiation is generally directed to the side of the MPLC from where the output beam originates. The MPLC is thus designed to break down the reflected radiation according to a second defined input mode base, this time in the output plane of the MPLC. The second output base is associated, by the conversion device MPLC, with a second output base that may be defined in the input plane or in a complementary plane of the conversion device. The complementary transformation between the second input base and the second output base implemented by the conversion device MPLC may very simply consist in guiding the reflected radiation, or a mode of the radiation, toward a complementary optical output of the optical device 1 that may be coupled to the control device CDE.

The four embodiments of the system for producing an output beam that have just been set out may be combined, in particular, when the deformation modes of the optical device 1 are selected according to the third configuration (hybrid). The control device CDE can thus comprise a plurality of inputs connected, respectively, to the input light beams FLI and/or to the output light beam FLS, and/or to the complementary output light beam FLSc, and/or to the reflected radiation or a portion thereof. It is thus possible to implement very flexible control of the phase actuators of the source, and to respond to a number of use cases of the production system.

Of course, the present disclosure is not limited to the embodiments described, and it is possible to add variants thereto, without extending beyond the scope of the invention as defined by the claims.

The invention claimed is:

1. An optical device for forming an output light beam having at least one target mode, by combining a plurality of phase-locked input light beams collectively forming incident light radiation, the device comprising:
    an input plane transverse to the input light beams in which an input mode base is defined, which base is made up of a main supermode formed of a linear combination of primary modes each having a specified phase and amplitude, the primary modes being, respectively, spatially associated with the input light beams, and in which a plurality of interference supermodes are defined;
    an output plane transverse to the output light beam, in which an output mode base is defined, which base is made up of the target mode and a plurality of deformation modes; and
    a multi-plane light conversion device, comprising a plurality of microstructured zones arranged on at least one optical element to intercept and spatially modify the phase of the incident light radiation during a plurality of reflections or transmissions separated by free propagation, the multi-plane light conversion device arranged between the input plane and the output plane, and the microstructuring of the plurality of microstructured zones being designed to carry out a modal conversion of the incident radiation and to prepare transformed radiation, the modal conversion aiming to transport the part of the incident radiation present in the main supermode into the target mode, and aiming to transport the part of the energy of the incident radiation present in the interference supermodes into the deformation modes.

2. The optical device of claim 1, wherein the input light beams are distributed in a linear manner in strips, according to a single direction of the input plane, or in a matrix, or in a hexagon, according to two directions of the input plane.

3. The optical device of claim 2, wherein the supermodes of the input base are all of the same intensity.

4. The optical device of claim 3, wherein the target mode is selected from the group consisting of a Gaussian mode, a "top-hat" mode, in far field or in near field, having a circular, rectangular, or square shape.

5. The optical device of claim 3, further comprising a modal filtering device integrated in the conversion device or arranged between the input plane and the conversion device, for eliminating secondary modes of the input light beams.

6. The optical device of claim 5, wherein the deformation modes are spatially superimposed on the target mode in the output plane, and the output light beam is formed entirely of the radiation transformed by the conversion device.

7. The optical device of claim 5, wherein the deformation modes are spatially separated from the target mode in the output plane, and the output light beam is formed exclusively of the part of the radiation transformed in the target mode by the conversion device.

8. The optical device of claim 5, wherein the deformation modes comprise a portion that is spatially superimposed on the target mode, and another portion of the deformation modes being spatially separated from the target mode.

9. The optical device of claim 1, wherein the target mode is selected from the group consisting of a Gaussian mode, a "top-hat" mode, in far field or in near field, having a circular, rectangular, or square shape.

10. The optical device of claim 1, wherein the input base comprises N-1 interference supermodes, an interference supermode of the order k, $2 <= k <= N$ being defined as the product, at any point of the input plane (x, y), of the main supermode with the Walsh function of the order k, Wk(x, y).

11. The optical device of claim 1, further comprising a modal filtering device integrated in the conversion device or arranged between the input plane and the conversion device, for eliminating the secondary modes of the input light beams.

12. The optical device of claim 1, wherein the deformation modes are spatially superimposed on the target mode in the output plane, and the output light beam is formed entirely of the radiation transformed by the conversion device.

13. The optical device of claim 1, wherein the deformation modes are spatially separated from the target mode in the output plane, and the output light beam is formed exclusively of the part of the radiation transformed in the target mode by the conversion device.

14. The optical device of claim 13, wherein the deformation modes are spatially separated from one another, and the device also forms complementary output light beams formed, respectively, of the part of the radiation transformed in the deformation modes by the conversion device.

15. The optical device of claim 1, wherein the deformation modes comprise a portion that is spatially superimposed on the target mode, and another portion of the deformation modes being spatially separated from the target mode.

16. The optical device of claim 15, wherein the portions of the deformation modes that are spatially separated from the target mode are also spatially separated from one another, and form complementary output light beams.

17. A system for producing an output light beam, comprising:
    at least one source producing a plurality of phase-locked beams;
    a device for controlling the phase of the plurality of beams; and
    an optical device according to claim 1, the optical device being arranged downstream of the source so as to bring the plurality of beams into optical correspondence with the primary modes of the main supermode of the input plane of the device.

18. The system of claim 17, wherein the control device is designed to lock the phase of the plurality of beams to a mutual phase shift setpoint corresponding to the mutual phase shift of the primary modes of the main supermode.

19. The system of claim 17, wherein the control device is configured to lock the phase of the plurality of beams to a mutual phase shift setpoint that is managed to change the shape of the output beam.

20. The system of claim 17, wherein the output light beam is configured to illuminate a target in far field, the system further comprising at least one detector for detecting radiation reflected by the target, the detector being connected to the control device.

\* \* \* \* \*